Jan. 20, 1959   F. G. THANNHAUSER   2,869,420
DEVICE FOR DISPLAYING MOVING INFORMATION
Filed Sept. 13, 1956   5 Sheets-Sheet 1
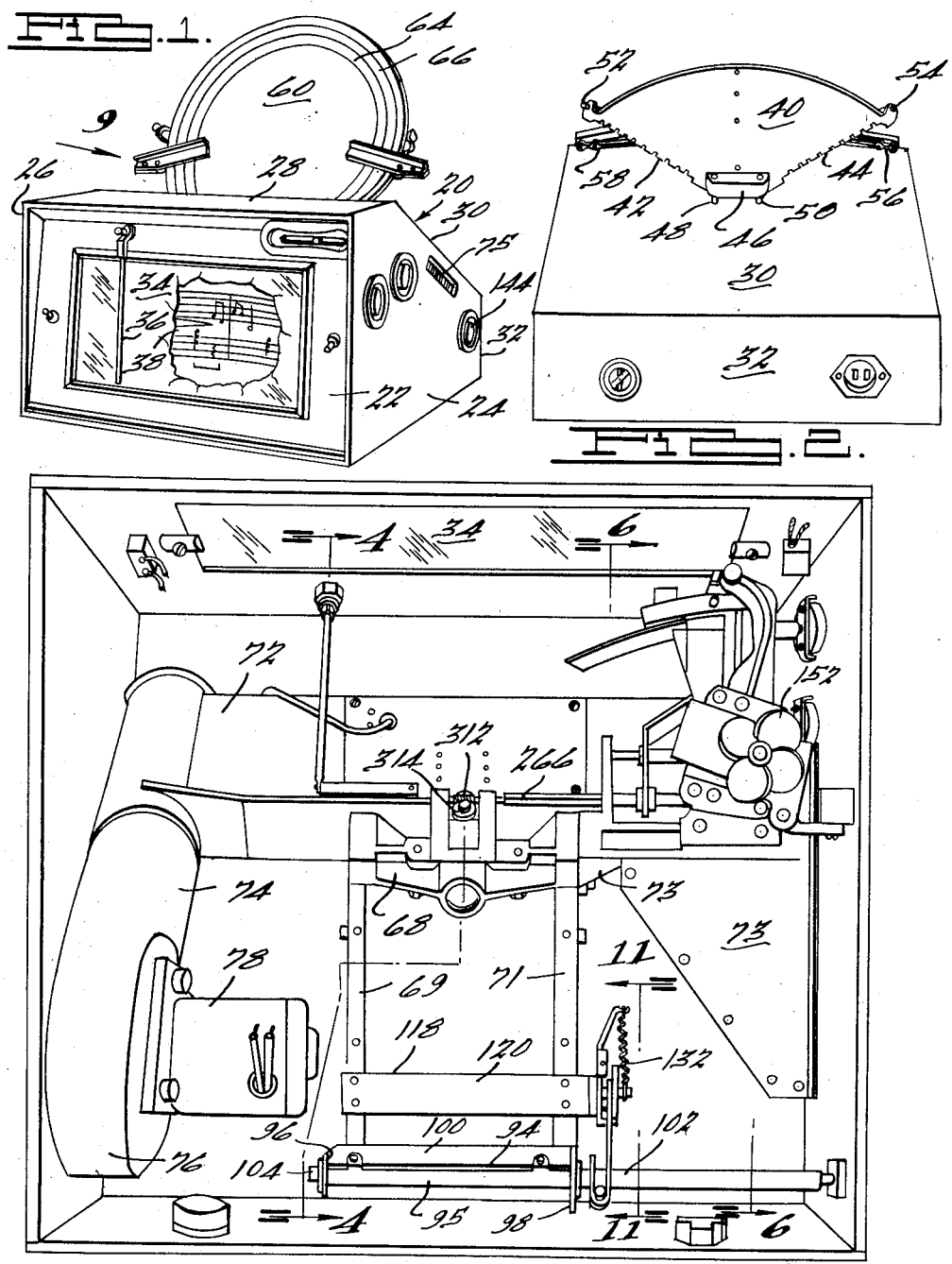
INVENTOR.
Fred G. Thannhauser
BY Jerry K. Harness
HIS ATTORNEY

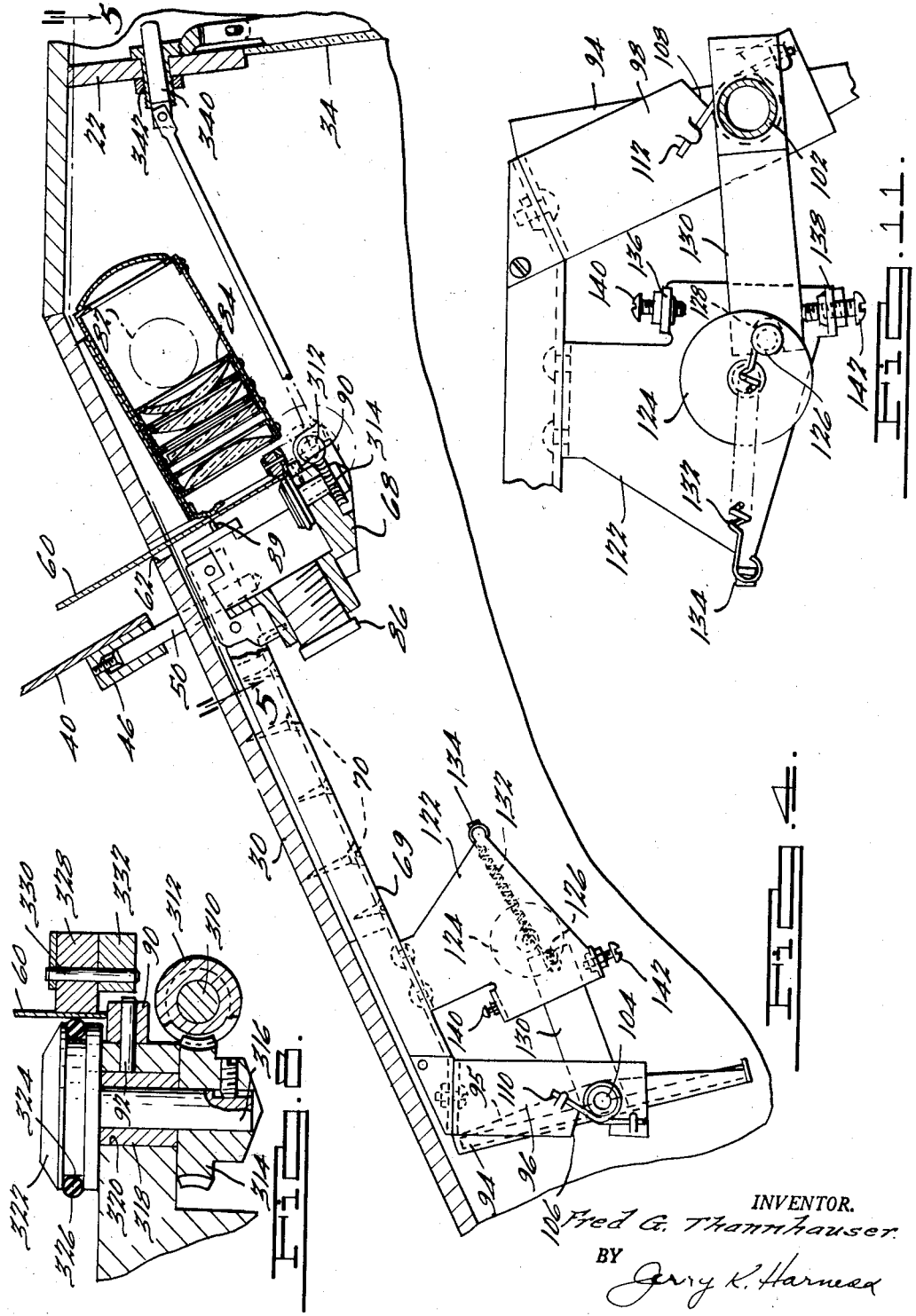

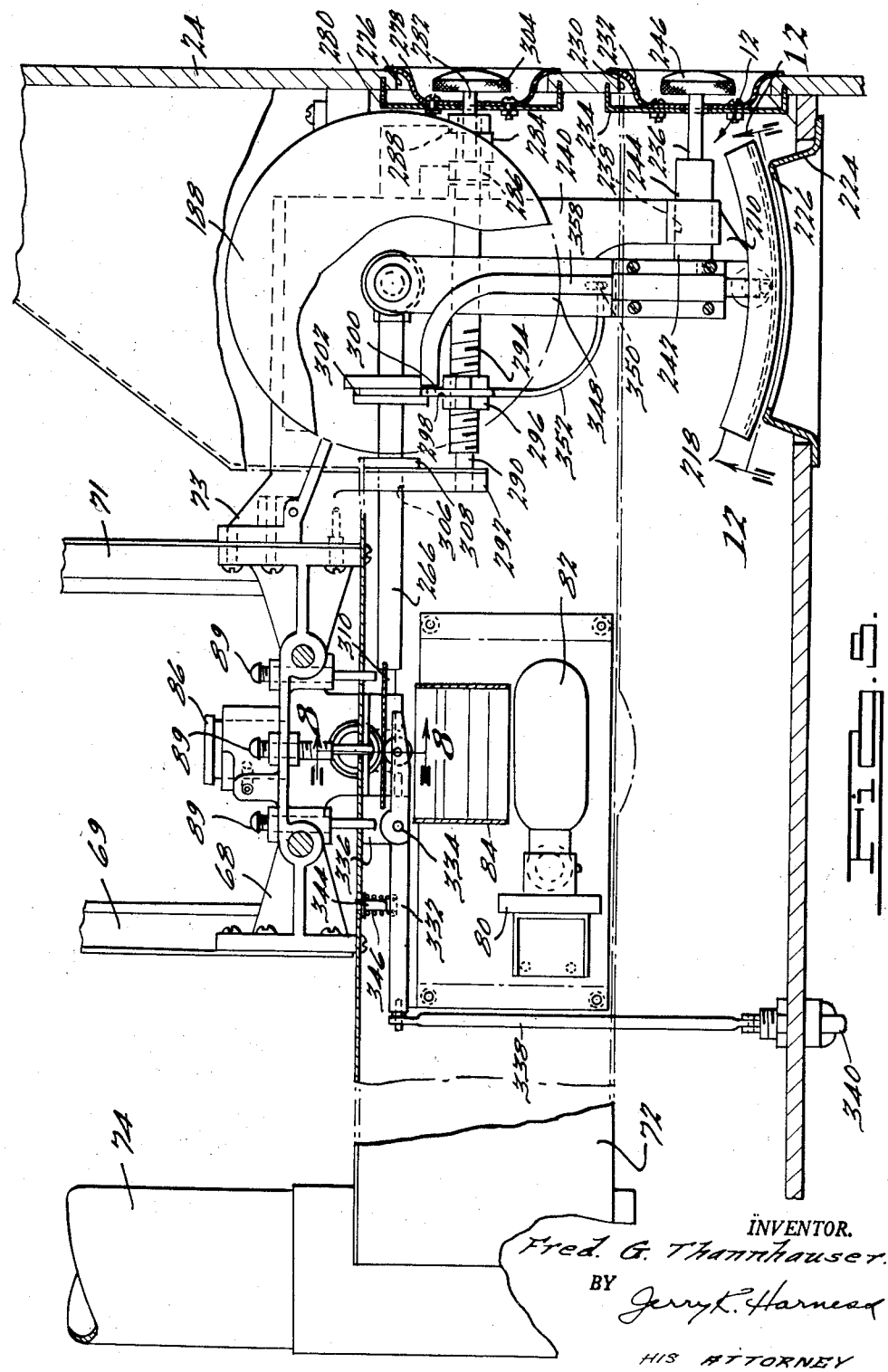

Jan. 20, 1959　　　F. G. THANNHAUSER　　　2,869,420
DEVICE FOR DISPLAYING MOVING INFORMATION
Filed Sept. 13, 1956　　　　　　　　　　　　　5 Sheets-Sheet 4
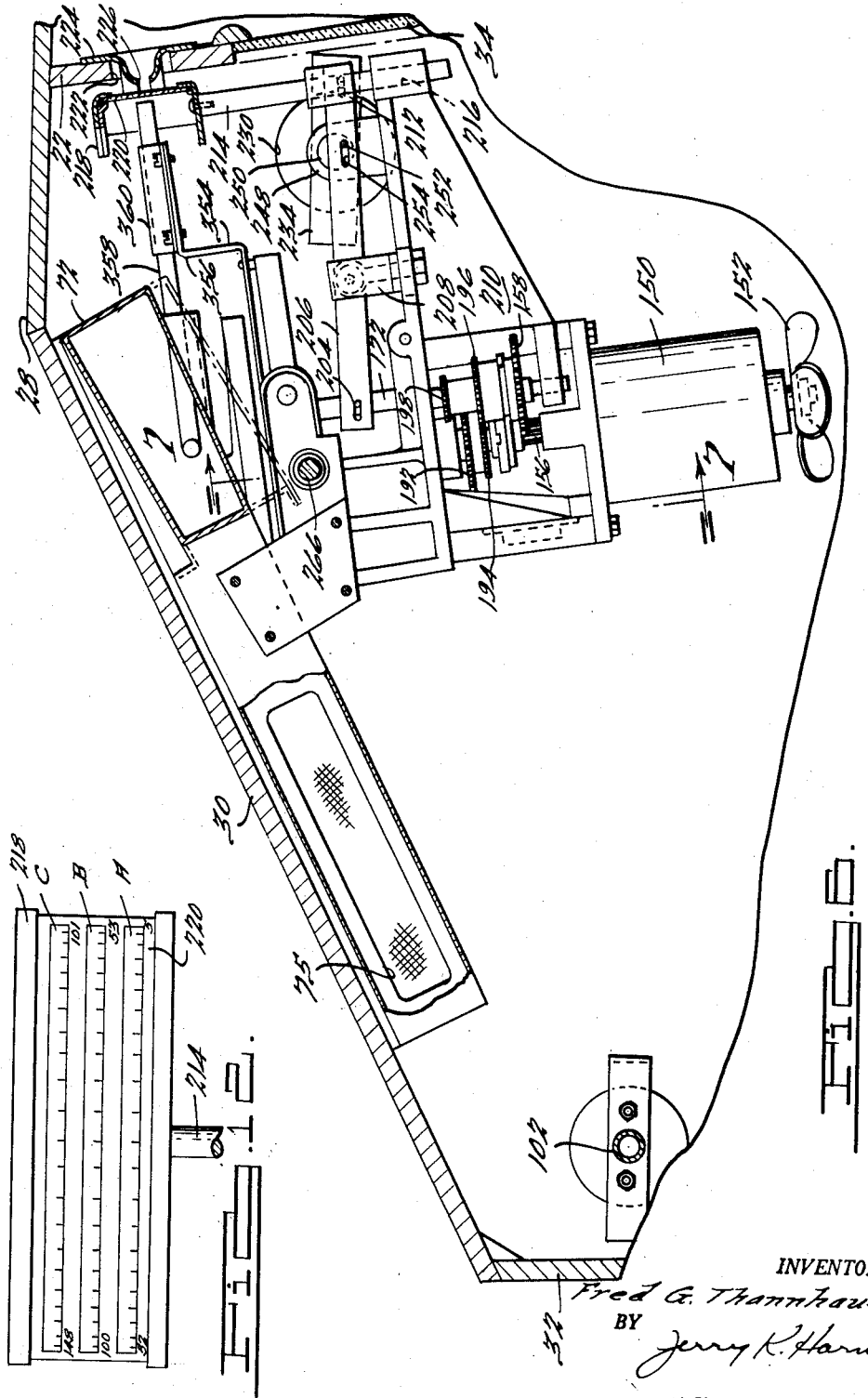
INVENTOR.
Fred G. Thannhauser
BY
Jerry K. Harness
HIS ATTORNEY Jan. 20, 1959  F. G. THANNHAUSER  2,869,420
DEVICE FOR DISPLAYING MOVING INFORMATION
Filed Sept. 13, 1956  5 Sheets-Sheet 5
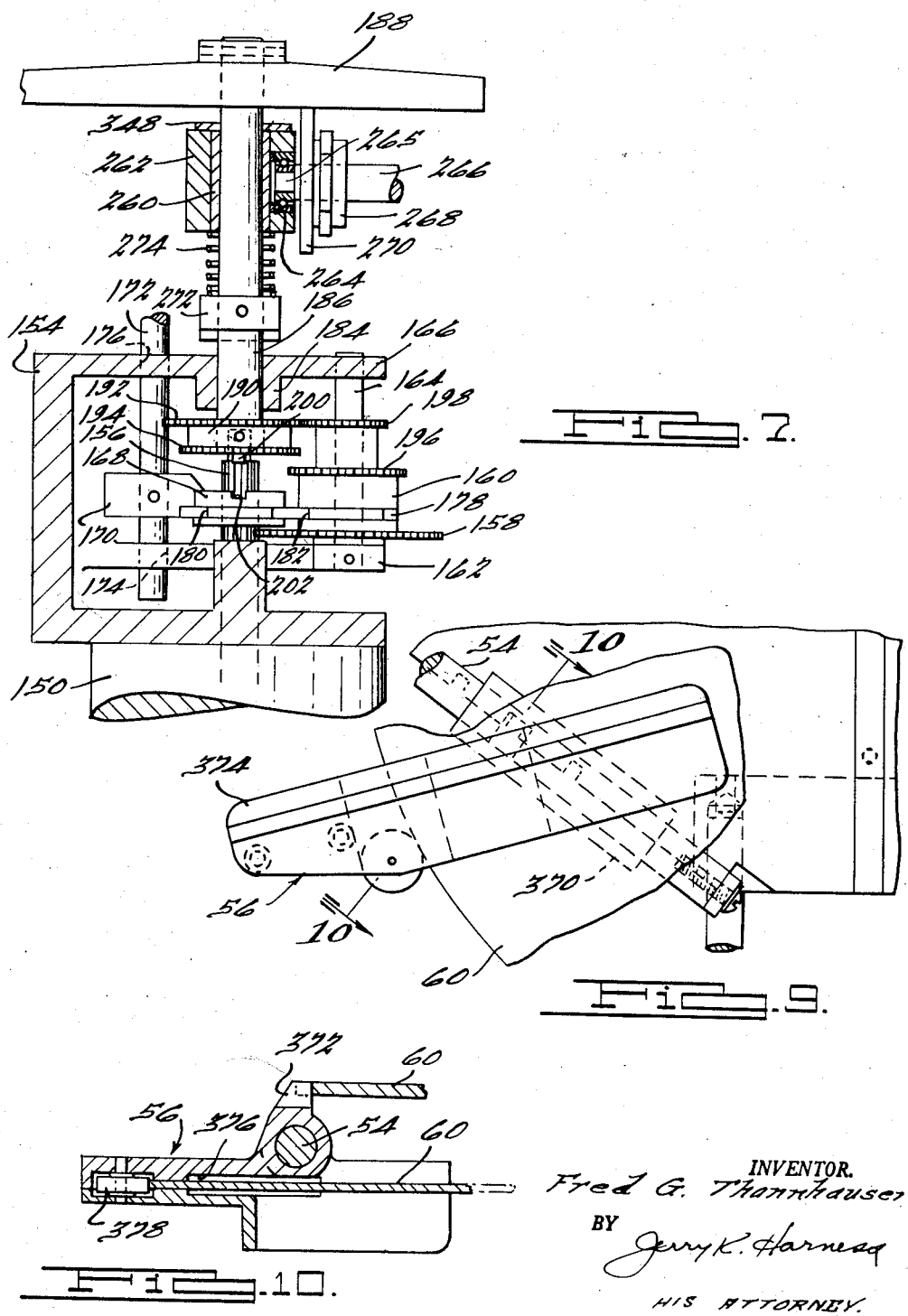
INVENTOR.
Fred G. Thannhauser
BY
Jerry K. Harness
HIS ATTORNEY.

United States Patent Office 2,869,420
Patented Jan. 20, 1959

2,869,420

DEVICE FOR DISPLAYING MOVING INFORMATION

Fred G. Thannhauser, Royal Oak, Mich.

Application September 13, 1956, Serial No. 609,677

5 Claims. (Cl. 88—27)

My invention relates to projection devices and has particular reference to an improved instrument for providing moving information on a stationary screen.

The present invention was originally designed as an aid to the presentment of music from a musical instrument. Other applications have been found, however, to present further uses of the invention.

A principal object of the invention is to provide an improved device which is capable of presenting moving information on a stationary screen at infinitely variable speeds between predetermined limits.

Another object of my invention is to provide an improved device of the aforementioned type which is very compact and easily handled by the operator thereof.

Still a further object of the invention is to provide an improved device which is easily as well as economically manufactured.

More particularly, the invention relates to an improved device for presenting moving information on a stationary screen which is contained within an enclosure approximately one-half the size of a conventional table model television set. The device is portable and may be easily moved to a desired location, whether it is on top of a piano or in the window display of a store.

A film disc of a predetermined size is inserted into the device and contains the information to be shown. The film disc is engaged by a driving member which selectively drives the disc at any desired speed between predetermined limits. The information on the disc is projected with the help of a mirror to the viewing screen at the front of the device.

Other objects and advantages will become more apparent from the following description of one embodiment of my invention, reference being had to the accompanying drawings in which:

Fig. 1 is a perspective view of my improved device.

Fig. 2 is a rear view of the device.

Fig. 3 is a bottom view of the device showing the interior thereof.

Fig. 4 is a sectional view taken on the line 4—4 of Fig. 3.

Fig. 5 is a sectional view taken on the line 5—5 of Fig. 4 and having portions broken away to more clearly illustrate the invention.

Fig. 6 is a sectional view taken on the line 6—6 of Fig. 3.

Fig. 7 is a sectional view taken on the line 7—7 of Fig. 6.

Fig. 8 is a sectional view taken on the line 8—8 of Fig. 5.

Fig. 9 is an elevational view taken generally in the direction of the arrow "9" shown in Fig. 1.

Fig. 10 is a sectional view taken on the line 10—10 of Fig. 9.

Fig. 11 is a sectional view taken on the line 11—11 of Fig. 3.

Fig. 12 is a view taken on the line 12—12 of Fig. 5, illustrating the indicia plate.

Before going into a detailed description of the present device, it should be noted that some component parts have been left out of the drawings so that the reader may more clearly understand the invention. For example, the electrical wires which run to the switches and to the outlets from the projection lamp blower motor and the transmission motor have been left out so that the drawings will not be confused by these additional lines. Similarly, as for example in Figs. 4, 5, and 6, the background mechanisms have not been shown (they are shown in other views) so that the mechanism in section will not be confused with a multitude of additional lines.

Referring now to the drawings, there is shown in Fig. 1 a perspective view of my improved device including a bottomless cabinet generally indicated by the numeral 20 having a front panel 22, side panels 24 and 26, top panel 28, a sloping rear panel 30, and a back panel 32. The front panel 22 is provided in a symmetrical manner with an opening which receives a glass screen 34, the latter being of the conventional type which will receive and display a projection. The front panel 22 is also provided with a vertically mounted rod 36 which is used as a reference line for the information presented on the screen. It will be noted that at 38 on the screen 34 a group of musical notes are displayed. This showing is for the purpose of illustration. It is not unforeseeable that many other types of information could be projected on the screen 34.

The sloping rear panel 30 is provided with a pre-shaped film holder 40 which is notched on its lower converging edges 42 and 44. The holder is provided with a mounting member 46 which carries studs 48 and 50 (Fig 4), the latter extending into the panel 30 in such a manner to maintain the holder in the position shown in Fig. 2. Adjacent the notched edges 42 and 44, the holder 40 carries rods 52 and 54, the latter supporting guide members 58 and 56, respectively. A more detailed description of the members 56 and 58 is forthcoming. The guide members 56 and 58 receive and hold a film disc 60, the bottom portion of which extends through slot 62 in the panel 30 where it cooperates with mechanism hereinafter described. The disc 60 may be made of any suitable material such as photographic film and has contained thereon bands such as 64 and 66 of information to be projected on the screen 34. As in the case of musical projections, the musical notations on the disc are considerably smaller than the projected notations and may be placed on the disc, for example, by the conventional micro-filming process.

In viewing the drawings, and particularly Figs. 2, 3, and 4, it will be seen that a main casting 68 is secured to the legs 69 and 71, the latter being secured by screws 70 to the panel 30 and this casting 68 in cooperation with a second casting 73 forms the basis of securement for most of the component parts of the device. A rectangular enclosure 72 is secured to casting 68 and extends transversely of the device. The enclosure 72 communicates with and is secured to one end of a tubular enclosure 74. The enclosure 74 terminates at its other end in an enlarged portion 76 which carries a blower motor 78. The fan blades of the motor 78 are disposed in the enlarged portion 76 and serve to circulate air through the enclosures. The other end of the enclosure 72 communicates with an enclosure 73, the latter being connected with an opening 75 in the panel 24 forming an exhaust passage for the circulated air.

Secured inside the enclosure 72 is a lamp fixture 80 which supports a projection lamp 82. Disposed adjacent to the lamp 82 and supported in the enclosure 72 is a light condensing device 84. A lens and holder member 86 are threaded into an opening 88 in the casting 68. The area between the condensing device 84 and the lens member 86 is the location into which the film disc 60 drops when it is inserted through the slot 62. The film disc 60 has its lower edge riding on a roller 90 (Fig. 8) which is rotatably mounted on a horizontal pin 92, the latter being carried in the casting 68. The film disc 60 is also positioned by three set screws 89 which are threaded through the casting 68 and extend through the wall of the enclosure 72. The disc 60 is rotated by mechanism hereinafter described.

As heretofore stated, the film disc 60 is provided with two bands 64 and 66 of information that may be projected on the screen 34. To accommodate these projections, a mirror 94 is pivotally supported by brackets 96 and 98 at the rear of the device. The brackets 96 and 98 are integrally connected by strip 100 which is secured to the legs 69 and 71. The mirror 94 is carried by frame 95 which is provided with end shafts 102 and 104 which are disposed in slots 106 and 108 in the brackets 96 and 98, respectively, on opposite sides of the mirror. Shaft 104 is merely a stub shaft. Wrap-around springs 110 and 112 are disposed around the shafts 102 and 104 and have their ends secured to the brackets 96 and 98, respectively, and serve to maintain the shafts in the slots of the brackets.

As viewed in the drawings, and especially Fig. 4, the mirror 94 is disposed in position to reflect the inner band 64 of information onto the screen 34. In order to reflect the outer band 66 of the film disc onto the screen, the mirror 94 must be rotated to a second position.

In order to accommodate this pivotal movement of the mirror, there is provided a bracket 118 having a transverse portion 120 secured to the legs 69 and 71 and a depending portion 122. The depending portion 122 is provided with rotatably mounted disc 124 which has a pin 126 eccentrically mounted thereon. The pin 126 is received in an open slot 128 disposed in one end of a link 130, the other end of which is fixed to the shaft 102. A coil spring 132 is connected between the pin 126 on the disc 124 and a tab 134, the latter being integral with the bracket and being substantially in line with the shaft 102 and the axis of the disc 124. The depending portion 122 of the bracket at opposite sides of the link 130 is also provided with struck-up tabs 136 and 138 which receive adjustment and limiting screw assemblies 140 and 142, respectively. In the position shown in the drawings, the link 130 engages the screw assembly 142 and is held in that position by the action of the spring 132 which urges the pin 126 and consequently the end of the link downwardly. To accommodate movement of the mirror to its other position, the shaft 102 extends transversely of the device to the side panel 24 and terminates in a knob 144. The operator need only to turn the knob 144 (Fig. 1) and the mirror is moved along with the link 130, both being pivoted about the longitudinal axis of the shaft 102. The link, therefore, is moved from its position as shown in Figs. 4 and 11 to a position where it engages the screw assembly 140. During this movement the pin 126 carries the spring 132 over center and the spring now holds the end of the link 130 in its second position. It will be seen, therefore, that the screw assemblies 140 and 142 determine the limits and the movement of the mirror 94. As a result the adjustments of the positions of the mirror 94 are made by the adjustment of the screw assemblies 140 and 142.

Referring now to Figs. 5, 6, 7, and 8 in particular, a description of the mechanism for moving the film disc 60 will now be presented. An electric motor 150 having an air circulating fan 152 at one end is secured at its other end to a transmission support 154, the latter being a part of the casting 73.

The output of the motor 150 terminates in an elongated pinion 156 which meshes with a large gear 158 of a gear cluster 160. A boss 162, which is formed integrally with the transmission support 154, receives one end of a shaft 164, the other end of which is journalled in the upper face 166 of the transmission support 154. The shaft 164 is fixed in this position while the gear cluster 160 is rotatably mounted thereon. A dog clutch member 168 is slidably but non-rotatably mounted on the pinion 156. A shift fork member which has an enlarged portion 170 is fixedly mounted on a shift rod 172, the latter being slidably mounted in an opening 174 in the boss 162 and in an opening 176 in the upper face 166. The enlarged portion 170 of the shift fork is integrally connected to an extension piece 178, the latter having forked portions engaged in an annular recess 180 of the clutch member 168 and in an annular recess 182 disposed in the cluster gear 160. By this construction, vertical movement of the shift rod 172 causes vertical movement of the clutch member 168 as well as the gear cluster 160. The upper face 166 of the transmission support 154 is provided with a journal 184, which receives one end of a shaft 186, the other end of which is secured to a disc 188. The lower end of the shaft 186 below the face 166 is secured to a gear cluster 190, the shaft 186 terminating just above the top of the pinion 156. The gear cluster 190 includes an upper large gear 192 and a bottom or lower, smaller gear 194. Similarly the gear cluster 160 includes the lower aforementioned large gear 158, an intermediate medium sized gear 196, and an upper small sized gear 198.

As viewed in Fig. 7, the shift rod 172 is in its lower position so that the drive from the motor goes through the pinion 156 to the large gear 158 of the gear cluster 160, the latter in turn rotating the small gear 198. The gear 198 is meshed with the upper large gear 192 of the gear cluster 190, this last mentioned engagement causing the rotation of the shaft 186 and consequently the disc 188. The intermediate or second position of the transmission is shown in Fig. 6, wherein the shift rail 172 is moved upwardly as viewed in the drawing so that the gear 198 is no longer meshed with the gear 192, but the gear 196 is meshed with the gear 194 while the large gear 158 is still meshed with the pinion 156. It will be noted that this gear arrangement is faster than the aforementioned gear arrangement. The third and fastest speed of the transmission may be readily seen when it is noted that the lower gear 194 of the gear cluster 190 is provided with an eccentric pin 200, which engages in a notch 202 disposed in the clutch member 168. By this construction when the shift rod 172 is moved to its furtherest upward position, the gears on the gear cluster 160 are no longer in mesh with any of the gears on the gear cluster 190 and a direct drive is realized from the pinion 156 to the clutch member 168 to the gear 194 when the pin 200 is seated in the notch 202.

To effect the speed ratio changes, the rod 172 must be vertically moved. It will be noted, particularly in viewing Figs. 5 and 6, that the rod 172 extends upwardly from the transmission and is pivotally connected at 204 to one end of the rocker lever 206. A fulcrum member 208 is secured to an extension 210 of the casting 73 and has the rocker lever pivotally mounted thereon substantially in the middle of the rocker member. The opposite end of the lever 206 is pivotally connected to a collar 212, the latter receiving and being fixed to a substantially vertically mounted shaft 214. The lower end of the shaft 214 is journalled in a cylindrical opening 216 disposed in the outer end of the extension 210 of the casting 73. The upper end of the shaft 214 is secured to the lower surface of an indicia member 218, the latter being of a generally channel shaped cross-sectional configuration. The indicia member 218 is provided with an indicia plate 220, the latter containing three different bands of speed information A, B, and C as shown in Fig. 12. The indicia member 218 is disposed adjacent an opening 222 in the front panel 22. The opening 222 in the panel is covered from the outside by an escutcheon plate 224, which has an elongated slot 226 therein. The slot 226, as it will be noted in Fig. 6, is substantially aligned with the center portion of the indicia plate 220 to thereby show the center or middle band B of the three bands of speed information. This construction correlates with the position of the gears in the transmission shown in Fig. 6 since the position of these gears indicates the middle or intermediate speed of the transmission. As a result, it will be seen that when the shift rod 172 is moved to change to any one of the three positions of the transmission, the indicia member 218 is moved by the rocker lever 206 to any one of the A, B, or C bands of speed information disposed on the indicia plate 220. As seen in Fig. 1, the escutcheon plate 224, as well as the slot 226 therein, is elongated, the purpose being to indicate varying speeds of the device during any one of the transmission shift positions. It will be seen when viewing Fig. 12 that the three bands A, B, and C of speed information are, going from right to left, graduated in numbers. The device shown was numbered in the metronome system so that when music is displayed, the device could be varied continuously from metronome speeds of 5 to 145. For other uses of the device, the indicia plate 220 could be changed to any desired numbering system. A vernier adjustment of speed during any one of these three transmission shift positions will be hereinafter described.

To effect the movement of the shift rod 172 as well as the indicia member 218 to a different range or band, an opening 230 receives an escutcheon plate 232 as well as a back supporting plate 234. Extending through registering openings in the plates 232 and 234 is a shaft 236 which is journalled in a cylindrical opening 238 disposed in an extension 240 of the casting 73. Stop members 242 and 244 are disposed in opposite sides of the extension 240 to prevent axial movement of the shaft 236. One end of the shaft 236 is provided with a knob 246 while the other end is journalled in a boss 248 and terminates with a disc 250 which is secured and rotatable with the shaft. The disc 250 is provided with a pin 252 which rides in a slot 254 disposed in the rocker lever 206. It will be seen, therefore, that circular movement applied to the knob 246 by the operator of the device will cause the disc 250 to rotate thereby rocking the lever 206 to any one of the three transmission speed positions, as well as the three speed band positions shown on the indicia plate 220.

To obtain the vernier adjustment of speed in each transmission shift position, it will be necessary to describe the drive between the disc 188 and the film disc 60. Referring now more particularly to Fig. 7, the shaft 186 is journalled in a bearing 260, the latter being carried in a cylindrical sleeve 262. The sleeve 262 is integral with and forms a part of the casting 73 and is, therefore, fixed. The sleeve 262 receives a ball bearing assembly 264, which receives a reduced end 265 of a drive shaft 266. The drive shaft 266 has keyed thereon a sleeve 268 which has an enlarged annular section 270 engaging the under side of the disc 188. Rotation, therefore, of the disc 188 imparts rotation to the annular portion 270 of the sleeve 268 and imparts rotation to the drive shaft 266. A collar 272 is pinned to the shaft 186 and forms a seat for the lower end of the coil spring 274 which bears between the sleeve 262 and collar 272. The purpose of the spring is to urge the disc 188 continually against the enlarged annular portion 270 of the sleeve 268 to maintain a friction drive therebetween. The vernier drive is obtained by moving the sleeve 268 along the drive shaft 262 from a location towards the inner diameter portion of the disc 188 to the outer diameter portion of the disc 188, it being apparent that the outer diameter portion of the disc 188 will drive the sleeve and drive shaft at a greater speed than the inner diameter portion. To accomplish this movement of the sleeve 268, side panel 24 is provided with an opening 276 which receives an escutcheon plate 278 and a back supporting plate 280. The plates 278 and 280 are provided with aligned openings which receive a shaft 282 extending therethrough. As viewed more particularly in Fig. 5, the shaft 282 is journaled in an extension 284 of the casting 73 and is provided with stop members 286 and 288 which allow the shaft to turn about its longitudinal axis but which prevent axial movement thereof. The shaft 282 extends transversely of the device and is provided with a reduced section 290 which is journalled in an extension 292 of the casting 73. Adjacent the reduced end 290 the shaft is threaded at 294 and receives an internally threaded collar 296. The collar 296 is provided with an annular groove 298 which receives a fork member 300, the latter extending over and engaging in an annular recess 302 disposed in the sleeve 268 adjacent the enlarged annular portion 270 thereof. It will be seen, therefore, that rotation of a knob 304 disposed on the outer end of the shaft 282 imparts lateral movement to the threaded sleeve 296 and, therefore, to the sleeve 268 through the fork member 300. As a result, rotation of the knob 304 causes vernier adjustment of the speed of the device in view of the fact that drive shaft 266 is connected, through mechanism to be described, to the film disc 60.

Referring now more particularly to Figs. 3, 5, and 8, the drive shaft 266 extends from the bearing 264 disposed in the collar 262 transversely of the device and is supported by being journalled in an opening 306 in the extension 292 of the casting 73. At this location the shaft 266 is provided with a stop member 308, which prevents the sleeve 268 from moving too far leftwardly as viewed in Fig. 5. The shaft 266 terminates in a reduced portion 310 which has a worm 312 mounted thereon. The worm 312 meshes with a worm gear 314, which is secured to the lower end of a shaft 316. The shaft 316 is journalled in a bearing 318, the latter being disposed in an opening 320 in the casting 68. The upper end of the shaft 316 is secured to an annular member 322 which is provided with an annular recess 324, the latter carrying a rubber-like O-ring 326. By this construction, it will be seen that rotation of the drive shaft 266 causes rotation through the worm 312 and the worm gear 314 through the annular member 322 and consequently the film disc 60 through the O-ring 326. To maintain the lower edge of the film disc 60 in engagement with the O-ring 326 to thereby insure a good frictional drive, there is provided a roller 328 rotatably mounted on pin 330 disposed in one end of a lever 332. Lever 332 is pivotally mounted at 334 on boss 336 extending up from the casting 68. The opposite end of the lever 332 from the roller is pivotally connected to one end of a link 338, the opposite end of which is pivotally connected to the inner end of a plunger 340. The plunger 340 is mounted in a fixture 342, which in turn is mounted in the front panel 22, the same fixture 342 being utilized to hold the pointer or reference rod 36 in position. A boss 344 mounted in the back wall of the enclosure 72 carries a spring 346 which engages and is seated in the lever 332. This spring urges the lever 332 in a counterclockwise direction, as viewed in Fig. 5, to thereby maintain the roller 328 against the film disc 60. The spring 346 also maintains the plunger in its outward position, as shown in Fig. 4, so that all that is necessary to release the film from the mechanism is to press the plunger and this action rocks the lever 332 and removes the roller 328 from engagement with the film disc so that the latter may be removed.

In order to indicate the vernier adjustment as heretofore described, attention is now directed to Figs. 5 and 6, where the vernier indication is more clearly shown. A strap 348 is mounted on the shaft 186 just above the sleeve 262 and extends toward the front of the device. Pivotally connected to the strap at 350 is a curved extension 352 of the fork member 300 so that movement of the fork member with the sleeve 268 and the collar 296 pivotally moves the strap 348 about the longitudinal axis of the shaft 186. The strap 348 is bent upwardly at 354 and then bent forwardly again at 356 where it is connected to a light pencil tube 358 by a clamping member 360. It is necessary to bend the strap 348 upwardly at this location so that the forward end of the light pencil tube 358 will be directly in back of the indicia plate 220 while the opposite curved end can extend into the enclosure 72. By this construction the light within the enclosure 72 is transferred through the tube out to the indicia plate to indicate the speed of the device. It should be noted also that as the knob 304 is turned to vary the vernier adjustment, the light pencil which is secured to the strap 348 is moved along the indicia plate to indicate the speed at the particular transmission setting being used. It should also be noted that the size of the various component parts are predetermined so that the vernier adjustment of the sleeve 268 along the disc 188 completely covers all speeds between the different transmission settings. In other words, the speed of the device when the sleeve 268 is disposed adjacent the outer peripheral portion of the disc 188 when the transmission is in its slowest speed is slightly less than the speed of the device when the sleeve 268 engages the disc 188 at its inner peripheral portion when the transmission is in its intermediate speed position. As a result, the device is continually and infinitely variable from its slowest speed in the first transmission position to its fastest speed in its third transmission position.

Referring now to Figs. 9 and 10, guide members 56 include an integral sleeve portion 370, which are slidably mounted on the rods, for example rod 54 shown in Fig. 9. The sleeve is provided with an integral tab 372 which is engageable with any one of the notches disposed in the notched edge 44 and as will be seen in viewing Fig. 10, it is only necessary to rotate the guide member 56 counterclockwise so that the tab 372 is out of the notch and the guide member may be slid along the rod 54 to any location desired, at which point it may be rotated back into position and the tab 372 located in a new notch. To hold the film disc 60, the guide member 56 is provided with a slotted portion 374 which has a slot 376 to receive the film disc 60 and which has a roller 378 secured thereto to engage the outer edge of the film disc and to thereby permit it to revolve. The purpose of the guide members 56 is not only to serve as means for supporting the film disc so that it may be revolved in its position but also to provide an adjustable device for accommodating different size film discs. This accommodation is facilitated in view of the fact that each one of the guide members 56 and 58 may be moved along the notched sides to any predetermined setting in accordance with the size of the disc to be used.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. A device for displaying moving information on a stationary screen comprising a housing, a screen carried by said housing, guide and support means carried by said housing and extending outwardly therefrom, a light source disposed in said housing, a lens mounted adjacent said light source to accommodate the projection of said moving information on said screen, a circular film disc carried and positioned by said guide and support means and having a portion extending into said housing between said light source and said lens, and drive means frictionally engaging said film disc and adapted to selectively move said disc at a plurality of predetermined speeds.

2. A device for displaying moving information on a stationary screen comprising a housing, a screen carried by said housing at the front portion thereof, a light source disposed in said housing, a lens mounted adjacent said light source to accommodate the projection of said moving information on said screen, a circular film disc having a portion extending into said housing and removably disposed between said light source and said lens, drive means engaging said film disc and adapted to selectively rotate said film disc at a plurality of predetermined speeds, and a mirror mounted at the rear portion of said housing and being disposed in a predetermined position to reflect the projected information from said lens onto said screen.

3. A device for displaying moving information on a stationary screen comprising a housing, a screen carried by said housing at the front portion thereof, a light source disposed in said housing, a lens mounted adjacent said light source to accommodate the projection of said moving information on said screen, a circular film disc having first and second bands of information and having a portion extending into said housing and disposed between said lens and said light source, drive means engaging the portion of said film disc disposed in said housing, and a mirror pivotally movable to first and second positions at the rear portion of said housing, said mirror in said first position being adapted to reflect said first band of information on said screen, and said mirror in said second position being adapted to reflect said second band of information on said screen.

4. A device for displaying moving information comprising a housing having a slot on the upper side thereof, a screen forming a part of the front of said housing, film disc support means mounting on top of said housing adjacent said slot, a light source disposed in said housing, a lens mounted adjacent said light source to accommodate the projection of said moving information on said screen, a circular film disc carried by said support means and having a portion extending through said slot into said housing between said light source and said lens, and power means disposed in said housing having a portion frictionally engaging a peripheral portion of said disc and adapted to rotate said disc.

5. The subject matter of claim 4, wherein said film disc support means is adjustable to accommodate different sizes of film discs.

References Cited in the file of this patent

UNITED STATES PATENTS

| | | |
|---|---|---|
| 1,837,944 | Blum | Dec. 22, 1931 |
| 1,951,054 | Kennedy | Mar. 13, 1934 |
| 2,272,622 | Rundle | Feb. 10, 1942 |
| 2,291,931 | Troeger | Aug. 4, 1942 |
| 2,503,740 | Jelinek | Apr. 11, 1950 |
| 2,558,999 | Aldrich | July 3, 1951 |
| 2,691,831 | Jordan | Oct. 19, 1954 |
| 2,715,784 | Genest | Aug. 23, 1955 |

FOREIGN PATENTS

| | | |
|---|---|---|
| 419,194 | Great Britain | Nov. 7, 1934 |

OTHER REFERENCES

"Popular Mechanics," vol. 101, No. 5, May 1954, page 10 cited.